(12) United States Patent
Hermann

(10) Patent No.: US 6,516,533 B1
(45) Date of Patent: Feb. 11, 2003

(54) DEVICE AND PROCESS FOR MEASURING THE MUTUAL ORIENTATION OF HOLLOW CYLINDER AND AN ASSIGNED CUT EDGE

(75) Inventor: Michael Hermann, Villingen (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/676,777

(22) Filed: Oct. 2, 2000

(30) Foreign Application Priority Data

Oct. 1, 1999 (DE) .......................................... 199 47 292

(51) Int. Cl.$^7$ ............................................... G01B 11/26
(52) U.S. Cl. .............................. 33/645; 33/286; 33/542; 33/DIG. 21
(58) Field of Search ................................ 33/1 BB, 286, 33/301, 318, 321, 324, 329, 542, 611, 645, DIG. 21

(56) References Cited

U.S. PATENT DOCUMENTS

| | | | | |
|---|---|---|---|---|
| 4,521,968 A | * | 6/1985 | Wiltermood et al. | 33/286 |
| 4,635,375 A | * | 1/1987 | Tarcsafalvi | 33/318 |
| 4,756,088 A | * | 7/1988 | Russell et al. | 33/318 |
| 5,038,485 A | | 8/1991 | Beissbarth | 33/301 |
| 5,274,566 A | | 12/1993 | Reed et al. | |
| 5,426,507 A | * | 6/1995 | Rando | 33/286 |
| 5,778,543 A | * | 7/1998 | Schneider et al. | 33/318 |
| 5,802,303 A | | 9/1998 | Rosenquist | 33/600 |
| 6,044,571 A | * | 4/2000 | Strait | 33/542 |

FOREIGN PATENT DOCUMENTS

| | | |
|---|---|---|
| DE | 195 46 405 | 6/1997 |
| JP | 10-160432 | 6/1998 |
| JP | 10-160433 | 6/1998 |

OTHER PUBLICATIONS

Diagnostic Instruments, Hand Held Computing Update Summer 1999, One Page.

* cited by examiner

*Primary Examiner*—G. Bradley Bennett
(74) *Attorney, Agent, or Firm*—Nixon Peabody LLP; David S. Safran

(57) ABSTRACT

A method and apparatus for measuring the mutual orientation of an optionally oriented hollow cylinder and a cut end of a body containing the hollow cylinder by employing a high-precision laser gyroscope. In using this method, the orientation measurements can be obtained in a more economical and time efficient manner than those employed using conventional methods. The method involves first placing a laser gyroscope on the inside wall of a hollow cylinder and electronically registering the three-dimensional orientation of said laser gyroscope according to at least two angular coordinates relative to a laboratory system; storing the three-dimensional orientation as a first measurement result; placing the laser gyroscope directly on the cut end, or indirectly on the cut end by resting it on a support mechanism that rests on the cut end; electronically registering the three-dimensional orientation of said laser gyroscope according to at least two angular coordinates relative to a laboratory system; storing the three-dimensional orientation as a second measurement result; comparing said first and second measurement results to obtain a value of a phase displacement angle; and displaying the value of the determined phase displacement angle. The device is especially suited for checking the orientation of cylinder heads and cylinder bore axes of large-volume diesel engines.

10 Claims, 4 Drawing Sheets

DEVICE AND PROCESS FOR MEASURING THE MUTUAL ORIENTATION OF HOLLOW CYLINDER AND AN ASSIGNED CUT EDGE

BACKGROUND OF THE INVENTION

1. Field of the Invention

The invention relates to a device and process for measuring the mutual orientation of a hollow cylinder and a cut edge assigned to it.

2. Description of Related Art

Conventionally, there has been a problem with measuring the mutual orientation of a hollow cylinder and its assigned cut edge, for example, in the checking of a cylinder of an internal combustion engine, especially in large-volume diesel engines. Typical dimensions of the cylinders of these engines are in the decimeter to meter range. High-precision acquisition of the relative position between the cylinder wall and the cut edge which is defined by the end surface of one such hollow cylinder is difficult and expensive for small wall thicknesses of the pertinent solid material.

SUMMARY OF THE INVENTION

The primary object of the invention is to devise a measurement process and a measurement device with which measurements of the aforementioned type can be taken in a very short time, and which can also be taken with a three-dimensional optional orientation of the hollow cylinder.

This object is achieved by the features of the described herein.

The invention is based on the finding that measurements of the aforementioned type are in principle angle measurements for which instead of mechanical measurement means better those based on electronics should be used.

In accordance with the invention, the noted measurement problem is solved by a high-precision optical gyroscope being used, preferably in the form of a so-called laser gyroscope with currently unsurpassed precision. It is recommended that a tri-axial gyroscope of this type be provided, although for simpler measurement tasks of this type, also bi-axially acting gyroscopes can be used.

The invention will be better understood and the above objects will be become more apparent from the following detailed description of preferred embodiments of the invention, with reference to the accompanying drawings.

DETAILED DESCRIPTION OF THE INVENTION

Figure 1:
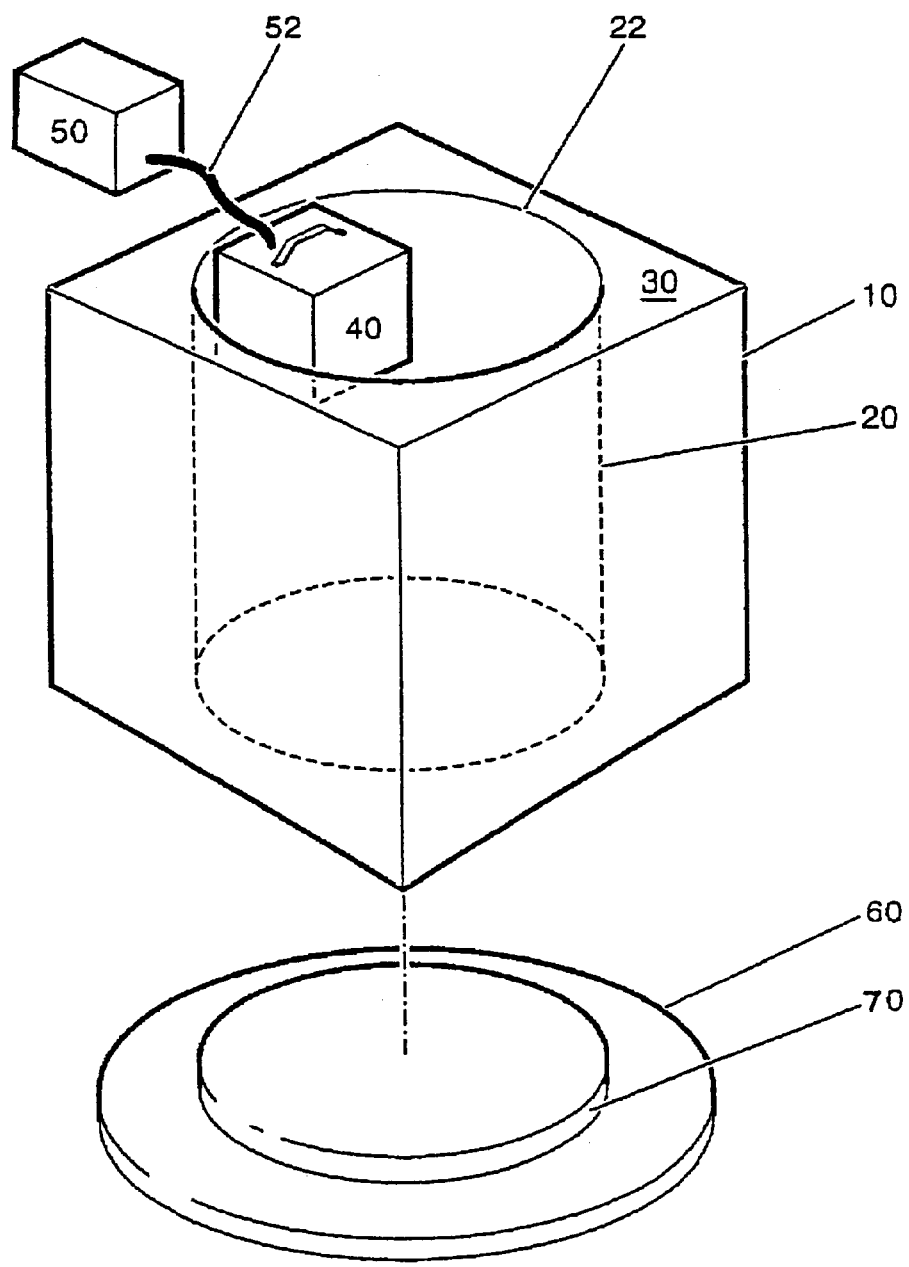
FIG. 1 is a first perspective view of a hollow cylinder and attached measurement instrument in a first measurement phase.

As illustrated in FIG. 1, a hollow cylinder 20 is located in a block 10 of solid material. An assigned top cut end 30 is defined by the periphery 22 of the hollow cylinder. The surface normal to this cut end 30 extends such that it is aligned parallel to the lengthwise axis of the hollow cylinder 20 with maximum possible precision. Checking of this circumstance is simple when employing the process according to the present invention with the aid of a laser gyroscope, and requires only a minimum of time. For example, a typical time savings of between 95% to 99% is obtained when compared to conventional measurement processes.

As further illustrated in FIG. 1, in a first measurement step a laser gyroscope 40 is attached from the inside to the jacket surface of the hollow cylinder 20 and by initiating a (first) measurement its orientation in space is fixed. Registration of the orientation values can take place in the laser gyroscope 40 itself, or in a computer 50 which simultaneously supplies power to the laser gyroscope 40 via line 52. In any case, provisions are made for the acquired measured values to be output at a later time, for example, by visual display or electronic data transmission. The first step is advantageously repeated several times to increase the measurement accuracy, especially at different points of the hollow cylinder jacket.

In a second step, the laser gyroscope 40 is subsequently removed from the hollow cylinder. In a third optional step, a support 60 including a cover plate having parallel planar surfaces, is placed on the top cut end 30. The support 60, being produced with high precision, is preferably produced of a glass ceramic having a very low coefficient of thermal expansion, but may also be produced from mirror glass. In addition, a bottom plate 70 of the same material is attached to the support 60, but has only centering functions that enable central insertion of the support 60 on the terminal edge 22 of the hollow cylinder 20.

Figure 2:
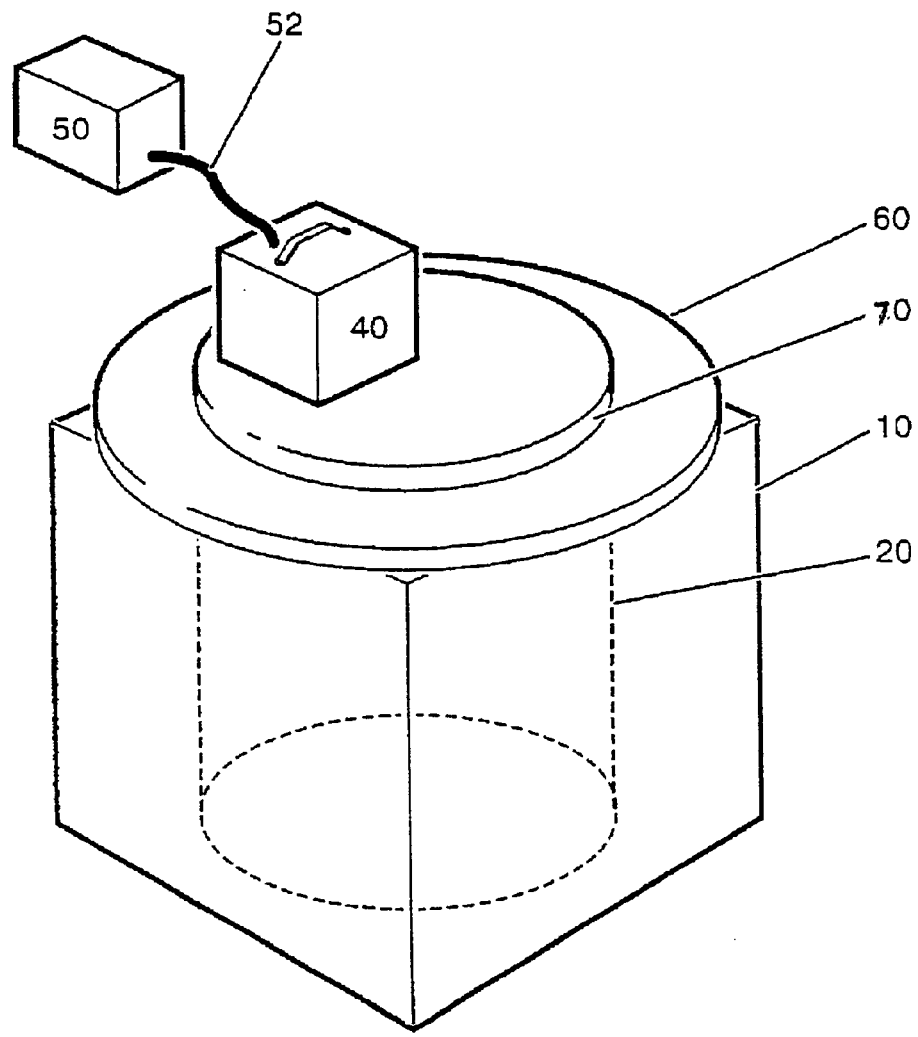
FIG. 2 is a second perspective view of a hollow cylinder and attached measurement instrument in a second measurement phase.

As illustrated in FIG. 2, in a fourth step, the laser gyroscope 40 is placed with its bottom surface resting precisely on the support 60, or it is positioned directly on the top cut end 30 if spatial conditions allow this in view of the required precision. In addition, in a fifth step, a (second) measurement by the laser gyroscope 40 is initiated.

When the wall around the hollow cylinder 20 is thick enough, the laser gyroscope 40 can be positioned directly on the top cut edge 30 as described below relative to FIG. 3 without the aid of a support 60 as previously described above relative to the optional third step, and in this way, the measurement process of the invention is obviously further simplified.

In a sixth step, the first and second measured values obtained in this way are compared to one another. The computer 50 can almost immediately compute and signal whether and in what directions a phase displacement angle of the top cut end 30 (for example, a cylinder head surface) is present relative to the lengthwise axis of the hollow cylinder defined by the wall of the hollow cylinder 20. These measurement results can be displayed with the required precision with an accuracy far better than one tenth of a degree.

Figure 3:
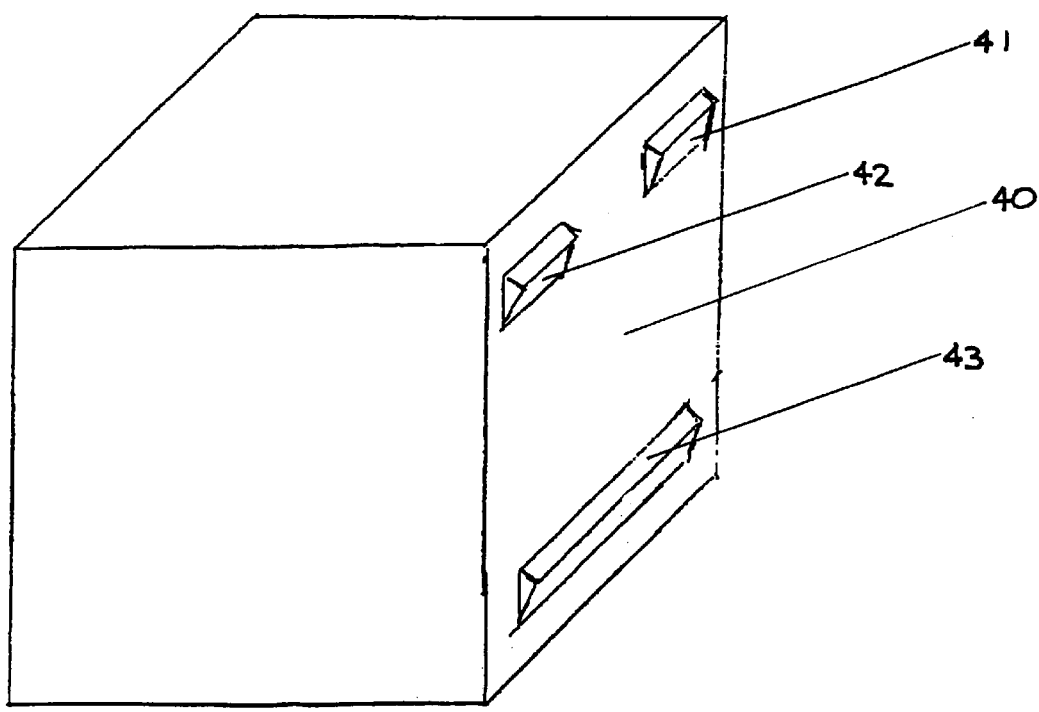
FIG. 3 is a perspective view of another embodiment in which a measurement instrument provided with measurement blades.
Figure 4:
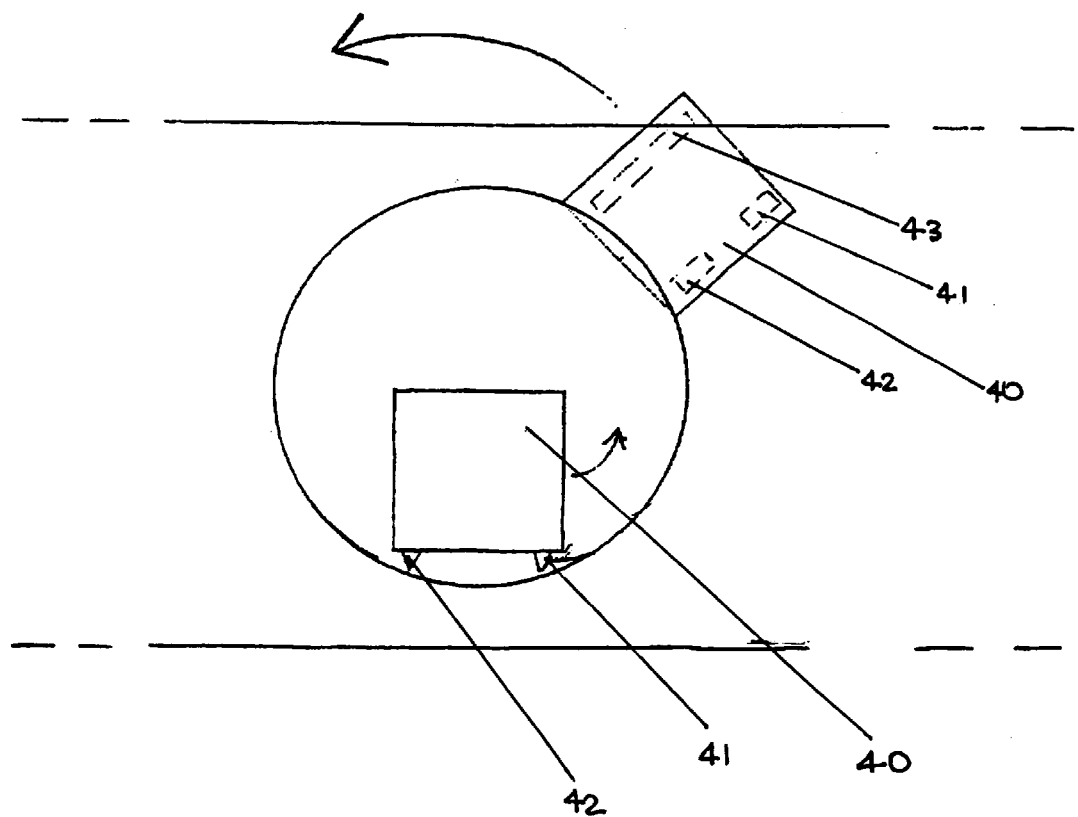
FIG. 4 is a plan view of the measurement instrument of FIG. 3 having measurement blades which contact the inside surface of the hollow cylinder and in which the measurement instrument is placed directly on the cut edge.

FIG. 3 illustrates an embodiment in which the laser gyroscope 40 is provided with measurement blades 41, 42, 43 to provide greater measurement accuracy. In operation, the distal end of each respective measurement blade 41, 42, 43 contacts a hollow or plane surface, for example, the jacket surface of the hollow cylinder 20 and the top cut edge 30. FIG. 4 illustrates a step whereby the laser gyroscope 40 is attached to the inner jacket surface of the hollow cylinder 20 to initiate a (first) measurement. The phantom outlined gyroscope illustrates a step whereby the laser gyroscope 40 is removed from the inner jacket surface of the hollow cylinder 20 and is subsequently placed directly on the top cut end 30 in a manner such that the measurement blades 41, 42, 43 contact the surface of the top cut end 30.

While the present invention has been described in connection with what is considered the most practical and preferred embodiment, it is understood that this invention is not limited to the disclosed embodiment but is intended to cover various arrangements included within the scope of the broadest reasonably interpretations and equivalent arrangements. For example, the present invention can also be used to check cut lines or end surfaces on other hollow cylinders with large dimensions.

What is claimed is:

1. A process for measuring the mutual orientation of a hollow cylinder and a cut end of a body in which the hollow cylinder is formed, said process comprising the steps of:

placing a laser gyroscope on an inner wall of a hollow cylinder;

electronically registering the three-dimensional orientation of said laser gyroscope according to at least two angular coordinates relative to a laboratory system;

storing said three-dimensional orientation as a first measurement result;

supporting said laser gyroscope on said cut end;

electronically registering the three-dimensional orientation of said laser gyroscope on said cut end according to at least two angular coordinates relative to a laboratory system;

storing said three-dimensional orientation as a second measurement result;

comparing said first and second measurement results to obtain a value of a phase displacement angle; and displaying said value of said determined phase displacement angle.

2. The process as claimed in claim 1, wherein said step of supporting said laser gyroscope on said cut end comprises placing said laser gyroscope directly on said cut end.

3. The process as claimed in claim 1, wherein said step of placing said laser gyroscope on a wall of a hollow cylinder placing comprises placing said laser gyroscope on an inside wall of the hollow cylinder.

4. The process as claimed in claim 1, wherein said laser gyroscope is provided with measurement blades, said measurement blades being used for contacting at least one of said inside surface of the hollow cylinder and a planar end surface of said cut end of the body during said electronically registering steps.

5. The process as claimed in claim 1, wherein said step of supporting said laser gyroscope on said cut end comprises the steps of placing a support for supporting said laser gyroscope on the end surface of said cut end and placing said laser gyroscope on said support.

6. The process as claimed in claim 1, wherein said step of placing the laser gyroscope on the inner wall of the hollow cylinder is repeated at different points around the circumference of the inner wall for increasing the accuracy of the first measurement result.

7. A device for measuring the mutual orientation of a hollow cylinder and a planar cut end of a body containing said hollow cylinder, said device comprising:

a high-precision laser gyroscope having means for contacting an inner surface of a said hollow cylinder and for mounting the laser gyroscope on an end surface of said cut end.

8. The device as claimed in claim 7, wherein a support mechanism is provided for supporting said laser gyroscope indirectly on said the end surface of said cut end.

9. The device as claimed in claim 7, wherein said device further comprises means for measuring directional characteristics of cylinders in large-volume internal combustion engines.

10. The device as claimed in claim 7, wherein said laser gyroscope is provided with measurement blades for contacting at least one of said inside surface of the hollow cylinder and a surface of said planar cut end of said body.

* * * * *